United States Patent
Stout et al.

(10) Patent No.: US 6,750,395 B2
(45) Date of Patent: Jun. 15, 2004

(54) POKE-THRU FITTING HAVING POLYMERIC BASED INTUMESCENT MATERIAL

(75) Inventors: Joseph B. Stout, Vienna, WV (US); Shailesh S. Bambardekar, Portland, CT (US)

(73) Assignee: Walker Systems, Inc., Williamstown, WV (US)

( * ) Notice: Subject to any disclaimer, the term of this patent is extended or adjusted under 35 U.S.C. 154(b) by 0 days.

(21) Appl. No.: 10/095,257

(22) Filed: Mar. 11, 2002

(65) Prior Publication Data

US 2003/0168231 A1 Sep. 11, 2003

(51) Int. Cl.[7] .................................................. H02G 3/22
(52) U.S. Cl. ............................. 174/48; 174/53; 174/50; 220/3.2; 52/220.8
(58) Field of Search ............................. 174/48, 53, 49, 174/50, 54, 55, 67; 220/3.2, 3.3, 3.4, 3.5; 52/220.5, 220.7, 220.8; 439/535, 536

(56) References Cited

U.S. PATENT DOCUMENTS

| | | | | |
|---|---|---|---|---|
| 4,273,879 A | * | 6/1981 | Langer et al. | 521/91 |
| 4,477,694 A | * | 10/1984 | Kohaut | 169/48 |
| 4,496,790 A | | 1/1985 | Spencer | 174/48 |
| 4,542,170 A | * | 9/1985 | Hall et al. | 523/179 |
| 4,588,523 A | | 5/1986 | Tashlick et al. | |
| RE32,678 E | * | 5/1988 | Benscoter et al. | 174/48 |
| 4,770,643 A | | 9/1988 | Castellani et al. | |
| 5,003,127 A | * | 3/1991 | Sosinski et al. | 174/48 |
| 5,017,153 A | | 5/1991 | Bowman | |
| 5,032,690 A | * | 7/1991 | Bloom | 174/48 |
| 5,132,054 A | | 7/1992 | Stahl | |
| 5,262,454 A | | 11/1993 | Leroux et al. | |
| 5,410,103 A | * | 4/1995 | Wuertz | 174/48 |
| 5,422,434 A | * | 6/1995 | Wuertz et al. | 174/48 |
| 5,443,894 A | | 8/1995 | Pollock et al. | |
| 5,476,891 A | | 12/1995 | Welna | |
| 5,505,497 A | * | 4/1996 | Shea et al. | 285/55 |
| 5,814,764 A | * | 9/1998 | Kohaut | 174/48 |
| 5,914,460 A | * | 6/1999 | Mowery et al. | 174/50 |
| 6,018,126 A | | 1/2000 | Castellani et al. | |
| 6,051,795 A | | 4/2000 | Fisher et al. | |
| 6,175,078 B1 | | 1/2001 | Bambardekar et al. | |
| 6,179,634 B1 | * | 1/2001 | Hull et al. | 174/48 |
| 6,316,725 B1 | * | 11/2001 | Cole et al. | 174/48 |

OTHER PUBLICATIONS

Cole et al (US 2002/0095887), Water-Tight Cover Assembly For An In-Floor Fitting, Jul. 25, 2002.*

* cited by examiner

Primary Examiner—Dean Reichard
Assistant Examiner—Angel Estrada
(74) Attorney, Agent, or Firm—McAndrews, Held and Malloy Ltd.

(57) ABSTRACT

A wiring fitting of the type adapted to be supported in a floor opening in a floor of a building structure. The fitting includes at least one intumescent fire retarding member formed from a polymeric based intumescent material. Employing a polymeric intumescent material allows the intumescent members to be formed by molding or extruding processes. A relatively rigid intumescent material may be used to form components including a tubular insert sized for insertion into the floor opening, as well as other components that could otherwise be formed from plastic, such as the cover plate, the receptacle barrier, and the trim flange. A relatively flexible polymeric based intumescent material can be used to form seals in the fitting.

16 Claims, 5 Drawing Sheets

POKE-THRU FITTING HAVING POLYMERIC BASED INTUMESCENT MATERIAL

RELATED APPLICATIONS

Not Applicable

FEDERALLY SPONSORED RESEARCH OR DEVELOPMENT

Not Applicable

BACKGROUND OF THE INVENTION

Poke-thru fittings are designed to be installed in an opening in a floor, such as a concrete slab or steel deck, in a building structure such as an office building to provide electrical receptacles and/or communication/data receptacles at desired locations in buildings. As explained in U.S. Pat. No. 4,770,643, source power and signal cables, loosely positioned in a plenum, which is between the ceiling of the floor below and the floor above (that is, the floor in which the opening is in), may be pulled from the plenum and connected with or passed through the poke-thru fitting for activation of services for and on the floor above. More specifically, high voltage source power cables are connected with power receptacles that may be mounted within the poke-thru fitting or surface mounted on the floor above the fitting. Lower voltage communication/data signal cables have traditionally been passed through the poke-thru fitting to provide above floor connections between these cables and equipment positioned on the floor above. More recently, poke-thru fittings have been developed that also provide for mounting the communication/data receptacle within the fitting.

Standards promulgated by Underwriters Laboratories (UL) require poke-thru fittings to enable the fire rating of the floor to be substantially the same with or without the floor opening and fitting therein. As a result, poke-thru fittings typically incorporate fire-retarding material, generally intumescent material, to retard the transmission of heat and flame from a fire in the plenum, for example. The intumescent material is activated upon exposure to a fire's heat and flames, rising through the floor opening from a fire below the floor. The intumescent material absorbs the heat and expands to fill open spaces in the floor.

Intumescent material, which is a hydrated compound, tends to age over time (that is, to become hardened by absorbing moisture or water). Poke-thru fittings are frequently used in new buildings having concrete floors. The moisture in the new concrete is a ready source of moisture for absorption by the intumescent material, which can result in undesirable aging of the intumescent material.

In the past, fire-retardant intumescent material have been made and stored in flat sheets. The sheets are cut into desired shapes for use in poke-thru fittings. These sheets are sandwiched between top and bottom layers of protective materials, but the cut, side edges of the intumescent material remain exposed since they are not covered by the protective layers. As a result, the sheet type intumescent material is proven to age due to moisture infiltration. In addition, the sheet form intumescent material is relatively flexible and therefore does not contribute significantly to the structural integrity of the fitting. The sheet form intumescent material is also cumbersome and time consuming to use during manufacturing because, for example, the large sheets of intumescent material must be stored, handled and cut into the desired configuration of incorporation into the fitting. A further drawback of the sheet form intumescent material is that it can only be used to form a limited number of structural geometries.

In response to moisture degradation problems associated with sheet form intumescent materials, U.S. Pat. No. 6,018, 126, which is assigned to the assignee of the present invention, discloses encapsulating intumescent material with an composition, such as polyvinyl chloride (PVC), to protect the material against damage from high humidity and moisture and to retard premature aging and degradation. In implementation, this is accomplished by pouring the intumescent material into relatively thin-walled PVC cups or shells and then curing the intumescent material. This results in a relatively flexible intumescent insert that can be incorporated into the poke-thru assembly. However, because the intumescent insert of the '126 patent is relatively flexible, it does not contribute significantly to the structural rigidity to the fitting. In addition, the manner in which these inserts are formed is somewhat cumbersome and time consuming. Further, both the inserts of the '126 patent and the sheet form intumescent material can be compressed overtime resulting in a degreatation of the ground continuity of the fitting. For example, in the '126 patent, intumescent inserts 50 are secured between plates 39 and 70 by a connector 82 which also serves as a path for ground continuity. If the intumescent inserts 50 become compressed over time, the connection between the plates 39, 70 and the connector 82 can loosen, resulting in degradation of the ground continuity of the fitting.

BRIEF SUMMARY OF THE INVENTION

According to certain aspects of an embodiment of the present invention, a wiring fitting of the type adapted to be supported in a floor opening in a floor of a building structure. The fitting includes at least one intumescent fire retarding member formed from a polymeric based intumescent material. Employing a polymeric intumescent material allows the intumescent members to be formed by molding or extruding processes. A relatively rigid intumescent material may be used to form components including a tubular insert sized for insertion into the floor opening, as well as other components that could otherwise be formed from plastic, such as the cover plate, the receptacle barrier, and the trim flange. A relatively flexible polymeric based intumescent material can be used to form seals in the fitting.

Figure 1:
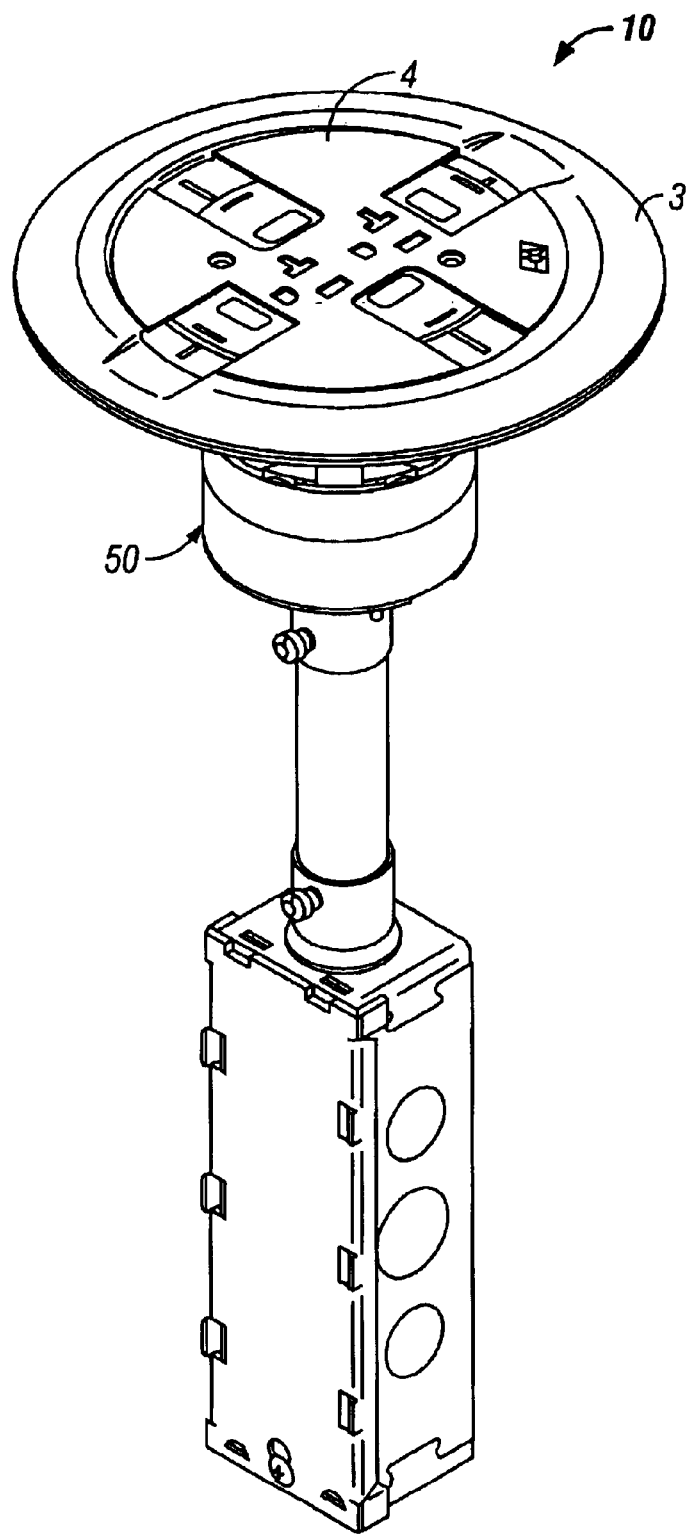
FIG. 1 is a perspective view of a poke-thru fitting constructed in accordance with certain aspects of the present invention.

The foregoing summary, as well as the following detailed description of the preferred embodiments of the present invention, will be better understood when read in conjunction with the appended drawings. For the purpose of illustrating the preferred embodiments of the present invention, there is shown in the drawings, embodiments which are presently preferred. It should be understood, however, that the present invention is not limited to the arrangements and instrumentality shown in the attached drawings.

DETAILED DESCRIPTION OF THE INVENTION

Referring to the drawings an in-floor fitting constructed in accordance with certain aspects of the present invention will be described. For illustration purposes, the fitting is described in the context of a poke-thru floor fitting. It will be appreciated, however, that the present invention has application beyond poke-thru fittings and may, for example, be used in preset fittings, after set fittings, floor boxes, or any other electrical fitting where there to incorporate intumescent material. Except as discussed below, the poke-thru fitting 10 may be constructed generally in accordance with the poke-thru fitting disclosed in U.S. patent Ser. No. 09/978,731, which was filed on Oct. 15, 2001 and is entitled "Water-tight Cover Assembly For An In-Floor Fitting" (the "'731" application), the disclosure of which is hereby incorporated by reference.

Figure 4:
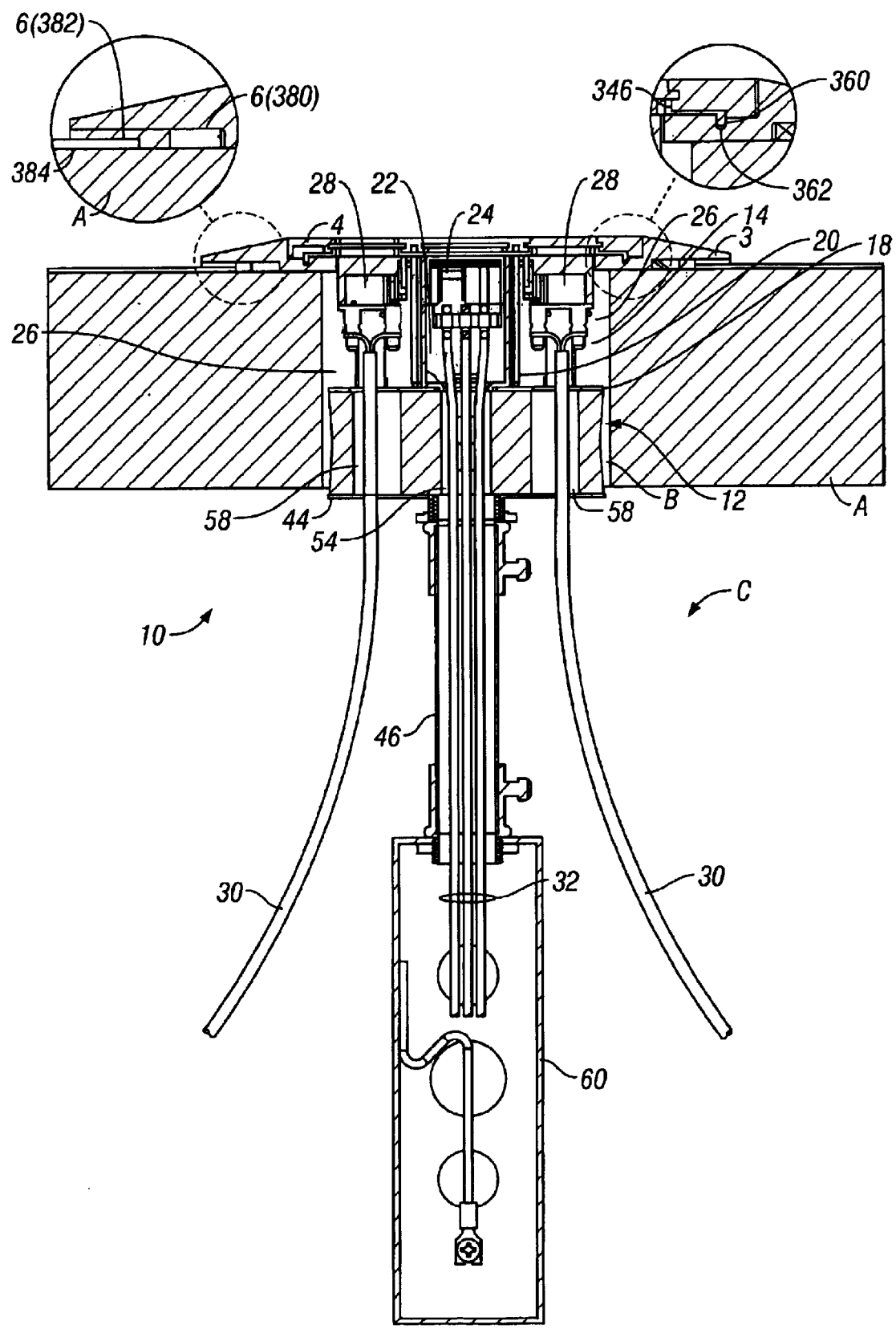
FIG. 4 is a cross-section view of the poke-thru fitting of FIG. 1 installed in a floor opening.

As can be seen in FIG. 4, the poke-thru fitting 10 is constructed for mounting in a fire-rated floor A of a building, such as a commercial office building. More specifically, the poke-thru fitting 10 may be installed in a circular opening B formed in floor A to activate a desired floor location. In this respect, the fitting is typically installed in a cored hole in a concrete floor. It is adapted to be activated by connecting source power service and communication/data signal service cables, which are otherwise disposed in the plenum C below the floor A, to fittings such as power receptacles and communication/data receptacles, respectively, mounted internally in the poke-thru fitting 10. This enables above-floor power plugs and signal transferring devices to be connected the poke-thru fitting 10 and to thus transfer power and communication/data signals to equipment located on or above the floor A.

The poke-thru fitting comprises an insert 12 that is adapted to be installed in a floor opening B. Insert includes an upper, generally cylindrical chamber or compartment 14, which is defined at the insert's upper end by a horizontally disposed top plate 16 and at its lower end by a horizontally disposed middle plate 18. (In the illustrated embodiment, the top plate 16 is generally defined by a trim flange 3). A receptacle barrier 20 divides the upper chamber 14 into a central space or portion 22, in which power receptacles 24 are disposed, and a pair of radially outer, semi-annular or side spaces or portions 26 in which communication/data receptacles 28 are disposed.

In this respect, the fitting has a plurality of communication/data receptacles 28 that are adapted to be activated within the fitting 10 by communication/data signal cables 30. Terminals in the upper faces of the receptacles 28 are accessible through access doors located in a cover plate 4 which overlies the upper compartment of the fitting. In the illustrated embodiment, the fitting 10 four (4) RJ-45 category 5 type jacks (e.g., receptacles). It will be appreciated, however, that the fitting could readily support other types of communication/data receptacles, such as fiber optic jacks.

The fitting 10 also supports at least one power receptacle 24 which is adapted to be activated within the fitting 10 by source power cables 32. In the illustrated embodiment, the power receptacle 24 is in the form of a duplex receptacle, which is configured to snap-mount into the trim flange 3, as is explained in greater detail in the '731 application. The outlets in the receptacle 24 may be wired in a single circuit or may be wired in a two electrically isolated circuits.

The receptacle barrier 20 physically separates and electrically isolates the connection between the power receptacle 24 and the power cables 32 from the connection between the communication/data receptacles 28 and the communication/data signal cables 30, so as to shield the communication/data signal cables, and their associated receptacles 28, from E.M.I. and/or R.F.I. emanating from the power cables 32. The receptacle barrier 20 is generally rectangular and includes a bottom wall 34, a pair of opposed side walls 36, a pair of opposed end walls 38, and a top opening which define the central space 22. The side walls 36 extend across the chamber 14 like chords and serve to divide the central space 22 from the side spaces 26. The receptacle barrier 20 shields the central space 22, where the high-voltage power cables 32 are connected to the power receptacles 24, from the side outer spaces 38, where the low-voltage communication/data signal cables 32 are connected to the communication/data receptacles 28. An opening is formed in the bottom wall 34 of the receptacle barrier 20 so the source power cables 32 can be routed into the central space 22. It will be appreciated that the number and mounting locations of the receptacles 24, 28 within the fitting 10 can be varied without departing from the scope of the appended claims. For example, the communications/data receptacles 28 could be mounted in the central space 22 and the power receptacles 24 could be mounted in the side spaces 26, as is generally shown in the U.S. patent application Ser. No. 09/642,951, which was filed on Aug. 21, 2000 and is entitled "Quad Receptacle, Dual Circuit Flush Poke-thru Wiring Fitting With Internally Mountable Communication/Data Jacks," (the "'951 application").

The receptacle barrier 20 may be formed of a dielectric material and may also include E.M.I/R.F.I. shield in the form a foil collector disposed on its side walls, as is generally described in U.S. Pat. No. 6,175,078, which issued Jan. 16, 2001 and is entitled "Flush Poke-thru Wiring Fitting Having A Height Adjustable Data Jack Mounting Bracket" (the "'078 patent"). Alternatively the shield may be in the form of a metal jacket as is described in the aforementioned '951 application.

The barrier is secured to the middle plate 18 by fasteners (not shown) which thread into reciprocal apertures in the plate 18. The barrier 20 may be grounded to drain E.M.I. and R.F.I. This can be accomplished by using longer fasteners (not shown) to connect the barrier 20 to a horizontally disposed bottom plate 44, which in turn is grounded through conventional electrical metalized tubing (EMT) 46, as is shown and described in the '078 patent and the '951 application. The upper end of a conventional electrical metalized tubing (EMT) connector 46 may be connected to the bottom plate 44 for securing a conduit system thereto and for improving grounding capability. A conventional junction box 60 may be connected to the lower end of the connector 46.

Figure 5:
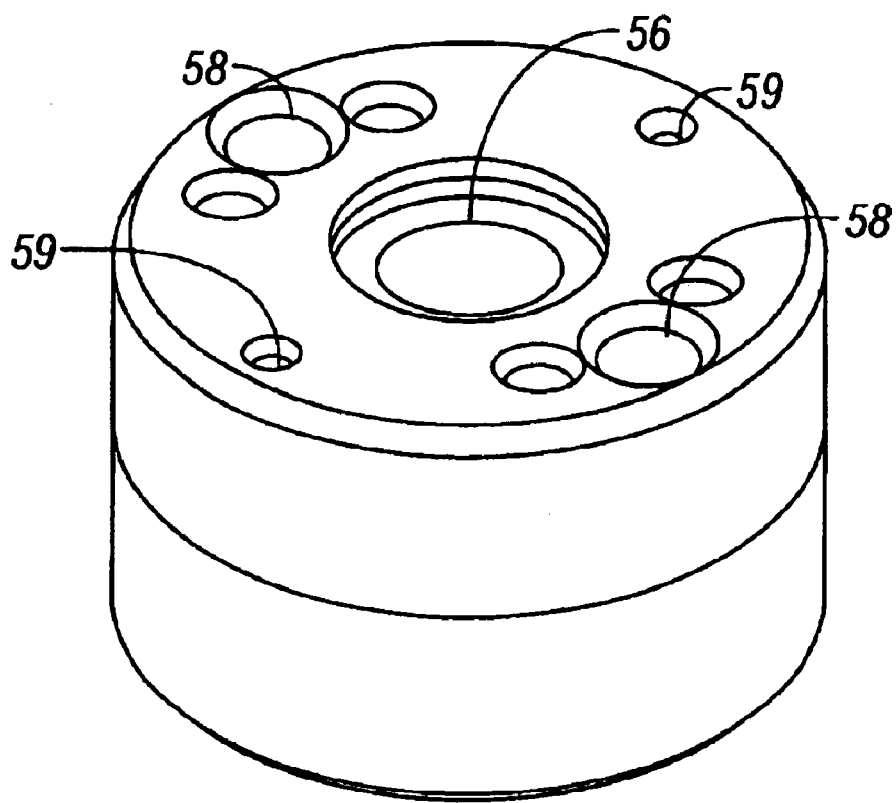
FIG. 5 is a perspective view of a molded intumescent insert.

Insert 12 further includes an intumescent insert 50 formed from a relatively rigid, polymeric based intumescent material, as is described in greater detail below. The intumescent insert 50 defines a central raceway or passage 54 through which the source power cables 32 are extendable, and two side raceways or passages 58 through which the source signal service cables 30 are extendable. The fire stopping elements of the intumescent insert 50 are supported between the middle plate 18 and the bottom plate 44. The middle and bottom plates 18, 44 have openings that align with the raceways 54 and 58 in the intumescent insert 50 to permit wires to pass between the plenum C and the upper chamber 14. Fasteners 63, such as rivets or bolts extend between the plates 18, 44 and through passages 59 (see FIG. 5) in the intumescent insert 50 to secure the plates around the intumescent insert 50 and to provide a path for ground continuity.

The poke-thru fitting also includes a conventional annular retainer 62 which is disposed adjacent the middle plate 18. The retainer 62 retains the poke-thru fitting 10 in floor opening B.

Figure 3:
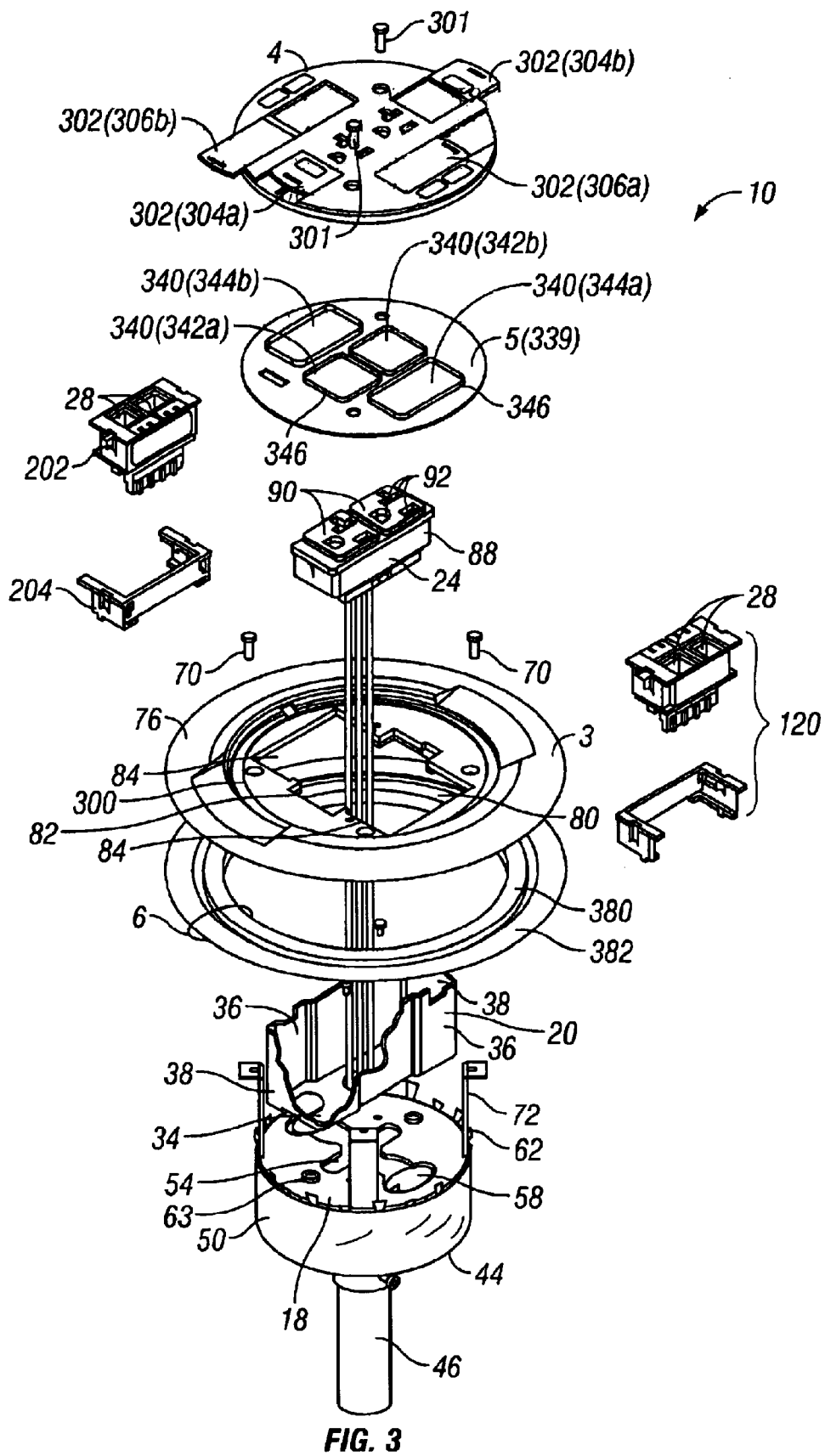
FIG. 3 is an exploded perspective view of the fitting of FIG. 1.

A cover assembly is connected with the upper end of the insert 12 and aligns with and overlies the floor opening B. As can be seen in FIGS. 1 and 3, the cover assembly includes a trim flange (or finish ring) 3, a cover plate 4, a first seal member 5, and a second seal member 6. The trim flange 3 is secured to the insert 12 by fasteners 70 that extend through the trim flange 3 and thread into reciprocal openings in legs 72 that extend upwardly from the middle plate 18. The trim flange 3 has a central opening 80 that overlies the upper chamber 14 of the insert. The opening 80 is defined by a central portion 82 that overlies the central space 22 of the chamber 14 and two side portions 84 that overly the side spaces 26 of the chamber 14. It will be appreciated that the portions 82, 84 of the central opening 80 could also be formed by three separate openings.

The central portion 82 of the opening 80 is sized to receive and support the power receptacle 24. The power receptacle 24 has a housing 88 which carries a pair of conventional electrical outlets 90 in its upper face. The outlets 90 present blade openings 92 which are oriented for receiving a conventional male electrical plug (not shown). The housing is preferably formed of a dielectric material and is configured to snap into place in the trim flange 3, as is explained in greater detail in the aforementioned '731 application. The source power cables 32 extend into the housing 88 and are interconnected with the outlets 10 for delivery power to the outlets 90, as is well known in the art. In this respect, the receptacle 24 may be pre-wired at the factory to reduce the required on-site installation time.

Alternatively, as is described in the in '731 application, the power receptacle 24 may, for example, comprise a pair of simplex power receptacles carried by a mounting bracket which is configured for connection to the trim flanges.

Each of the side portions 84 of the central opening 80 is configured to support at least one communication/data receptacle 28. In the illustrated embodiment, each side portion 28 supports a pair of communication/data receptacles 28. The communication/data receptacles 28 are carried by mounting brackets 120 configured for mounting in the side portions 84. The mounting brackets 120 may be height adjustable, as disclosed in the '078 patent, so that so that data jacks of varying configurations can be internally mounted in the fitting in a protected fashion.

The cover plate 4 is generally circular and is sized to fit in an annular recess formed in the top of the trim flange 3. A pair of threaded fasteners 301 secure the cover plate 4 to the to the trim flange 3 and compress the first seal 5 to seal against water infiltration between these components. The cover plate 4 includes a plurality of access doors 302 for selectively covering and exposing the receptacles 24, 28 carried by the fitting 10. In the illustrated embodiment, the cover plate 4 carries two power access doors 304a, 304b and two communication/data access doors 306a, 306b. Each of the access doors 304a, 304b is associated with one of the outlets 90 in the receptacle 24 and is slidingly movable between an inner, closed position (see, e.g., door 304a in FIG. 1) at which it overlies the associated outlet to prevent access thereto and an outer, open position (see, e.g., door 304b in FIG. 1) at which the outlet is exposed and accessible from above the floor. Similarly, each of the communication/data access doors 306a, 306b is associated with a pair of the communication/data receptacles 28 and is slidingly movable between an inner, closed position (see, e.g., door 306a in FIG. 1) at which it overlies the associated receptacles to prevent access thereto and an outer, open position (see e.g., the door 306b in FIG. 1) at which the associated communication/data receptacles are exposed and accessible from above the floor. It will be appreciated, that individual access doors could be provided for each of the communication/data receptacles 28. Similarly, a single access door could be provided for both of the outlets 90 in the power receptacle 24.

As was mentioned above, the fitting also includes first and second seal members 5, 6 to prevent moisture from infiltrating the inner compartment of the fitting 10. The first, or internal seal member 5 is in the form of a flexible, generally planar gasket 339 which is interposed or sandwiched between the cover plate 4 and the trim flange 3. The first seal member 5 has a plurality of access openings 340 which overlie the receptacles 24, 28 to provide access to the receptacles through the cover plate 4. In particular, the first seal member 5 includes a pair of power receptacle access openings 342a, 342b, each of which overlies one of the outlets 90 in the power receptacle 24. The first seal member also includes a pair of communication/data access openings 344a, 344b, each of which overlies a pair of the communication/data receptacles 28. It will be appreciated that separate communication/data access openings 344a, 344b could be provided for each of the communication/data receptacles 28. Moreover, the access openings for the power receptacles 24 could be in the form of slits which overlay the blade openings 92 in the receptacle, as is generally shown in U.S. Pat. No. 5,017,153. Ribs 346 extend upwardly around the perimeter of the access openings 340 and wrap around the receptacles 24, 28. Each of the ribs 346 is positioned to engage against the bottom face of a respective access door 302 when the door is at closed position so as to seal against water infiltration into the fitting.

As will be appreciated the ribs 346 could be eliminated and the seal 5 could have a planar top face located above the top faces of the receptacles 24, 28. However, the ribs 346 provide the added benefit of reducing the force required to open and close the slide-mounted access doors 302. This is because the ribs 346 minimize the surface area of the seal first member 5 that contacts the underside of the doors access 302, while still providing an adequate moisture seal against the access doors 302. Reducing the surface area of the contact between the seals first member 5 and the access doors 302 results in a corresponding reduction in the friction between the underside of a given access door and the seal as the door is moved between its open and closed position. This also reduces the spring force requirements for closing the slide-mounted access doors.

The first seal member 5 also has a second rib 360 or bead extending downwardly from its bottom face. (See FIG. 4). The rib 360 is sized and positioned to extend around the perimeter of the central opening 80 in the trim flange 3, and, hence, around the perimeter of the receptacles 24, 28. The second rib 360 seats in a reciprocal annular groove 362 formed in the upper face of the trim flange 3. This bead provides a watertight seal between the trim flange 3 and the first seal member 5 independent of the clamping pressure applied by the screws 301. As a result, fewer screws are needed to secure the cover plate 4 to the trim flange 3. The annular groove 362 in the trim flange 3 is sized to form an interference fit the second rib 360 to assist in preventing moisture infiltration between the cover plate 4 and the trim flange 3 and into the internal compartment 14 of the fitting 10. It will be appreciated that the rib 360 could alternatively be formed of a plurality of ribs, each of which surrounds one or more of the receptacles 24, 28.

Figure 2:
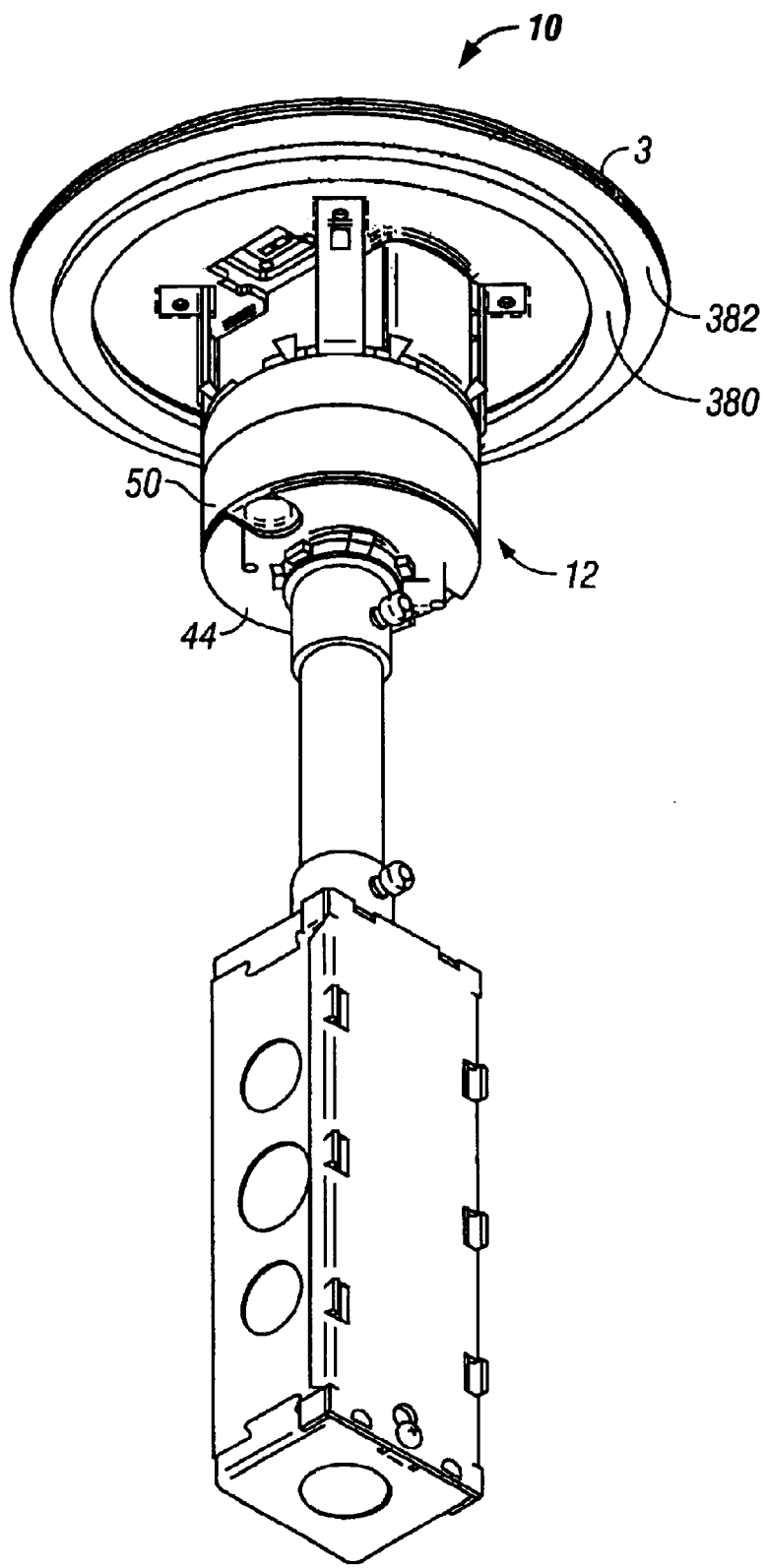
FIG. 2 is a bottom perspective view of the poke-thru fitting of FIG. 1, prior to installation of the communication/data receptacles.

The second seal member 6 includes at least one compressible annular gasket which extends around the perimeter of the floor opening and is compressed between the trim flange 3 and the floor to provide a watertight seal which prevents water from leaking into the fitting. As is shown in FIGS. 2 and 4, the second seal may include a first, inner gasket 380 which is sized such that it is compressed between the flange 3 and the main floor A, and a second, outer gasket 382 which is sized such that it is compressed between the finished floor 384 and the flange 3. The gaskets 382, 384 permit the trim flange 3 to be used with a variety of finished floor materials, including both carpet an tile. In this respect, the outer gasket 382 is thinner than the inner gasket 380. When the flange 3 is installed over a tile floor, the outer gasket 382 will be compressed between the flange 3 and the tile to seal against water infiltration. In such applications, the inner gasket 380 may or may not be compressed against the main floor. By contrast, in carpet application, the primary sealing function will typically be provided by the in inner gasket 380.

It will be understood that the construction of the poke-thru fitting thus far described is similar to the poke-thru fitting described in the '731 application. In will also be understood that the components thus far described may assume other configurations with out departing from the scope of the present invention.

One aspect of the present invention relates to the incorporation of a polymeric based intumescent material into a floor fitting, such as a poke-thru fitting, for example. The polymeric based intumescent material may be in the form of a relatively rigid, e.g., on the order of 75–85 SHORE D durometer hardness, intumescent material which can be molded or extruded to form the intumescent inserts 50 and/or any other component of the fitting which could otherwise be formed from a polymer. The ability to mold or extrude the intumescent material using conventional processes provides significant manufacturing and design advantages over the prior intumescent materials. For example, in addition to being used to make the intumescent insert 50, the polymeric based intumescent material can generally be used to construct any components that could otherwise be formed from plastic, such as the trim flange 3, the cover plate 4, the receptacle barrier 20, and/or the housings and other plastic portions of the receptacles 28, 30. Forming such components from the polymeric intumescent material, as opposed to plastic, increases overall fire retarding capabilities of the overall fitting by allowing more intumescent material to be designed into the fitting. The use of a plastic in the intumescent material also reduces the tendency of the intumescent material to degrade in the presence of moisture, which is a problem with some prior intumescent materials.

One suitable polymeric based intumescent material is PYROPHOBIC KL283-A as is available from Pyrophobic Systems, Ltd. of Barrie, Ontario Canada. The Pyrophobic KL283-A material is a blend of intumescent powder and polyvinyl chloride which can be compounded into pellets for use in conventional molding processes, such as injection or compound molding. Geon M3900, as is available from the PolyOne Corporation, is a suitable grade of polymeric material to blend with an intumescent material to form relatively hard polymeric based intumescent material. As will be appreciated, the relative ratios of the intumescent powder and the polymeric binder, as well as the specific materials used, will effect various characteristics, e.g.. hardness, moisture resistance, and fire retarding ability, of components formed from the polymeric based intumescent material. Components formed from the Pyrophobic KL283-A material are relatively rigid, and, hence, this material particularly well-suited for forming components such as the cover plate and the intumescent insert 50. Forming the intumescent insert 50 from a relatively rigid material adds to the structural rigidity of the fitting and eliminates the need to incorporate metal spacers between the middle and bottom plates 18, 44, as was typically needed in prior fittings to ensure proper ground continuity and structural rigidity.

A relatively flexible, e.g., on the order of 40 SHORE A durometer hardness, polymeric based intumescent material can be used to form flexible components such as the gaskets 339, 380 and 382. As was discussed above, the flexibility of the intumescent material can be controlled by the flexibility characteristics of polymeric material that is blended with the intumescent material, as well as the relative ratios of the polymeric and intumescent materials. For example, a relatively flexible, e.g., on the order of 40 SHORE A durometer hardness, polymeric material, such as Geon D70MO, which is a flexible vinyl compound sold by the PolyOne Corporation, can be blended with intumescent material and compounded into pellets suitable for injection molding or extrusion. Moreover, forming either or both of the gaskets 380, 382 of the flexible intumescent material causes the poke-thru fitting to raise slightly out of the floor opening during a fire. As a result, the fitting is moved farther away from the heat source, allowing it to perform better, i.e., the top surface of the fitting reaches lower maximum temperatures during a fire, than would be the case if the fitting did not raise up out of the floor opening.

While the invention has been described with reference to a preferred embodiment, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A cover assembly for use with a fitting of the type which is disposed in a floor and has an inner compartment accessible through an opening in the upper surface of the floor, the filling being configured support at least one receptacle within the inner compartment for access from above the upper surface of the floor, the cover assembly comprising:

a cover plate connected to the filling and overlying the receptacle, the cover plate having an access door movable between a first position at which the door overlies the receptacle to prevent access thereto and a second position at which the receptacle is exposed and accessible through the cover plate;

a seal member interposed between the filling and the cover plate for sealing against water infiltration therebetween; and wherein at least one of the cover plate and the seal member is formed of an intumescent fire retarding material.

2. The in-floor fitting of claim 1, wherein the seal member is formed of a flexible polymeric based intumescent fire retarding material.

3. In an in-floor fitting of the type which is disposed in a floor and has an inner compartment accessible through an opening in the upper surface of the floor, the fitting being configured to support at least one power or communication receptacle within the inner compartment for access from above the upper surface of the floor, the improvement comprising a seal member positioned to seal against water infiltration into the floor fitting, the seal member being formed of an intumescent fire retarding material.

4. The in-floor fitting of claim 3, wherein the seal member is molded from a flexible polymeric based intumescent fire retarding material.

5. In a wiring fitting that is adapted to be supported in a floor opening in a floor of a building structure, the wiring fitting including a flange that extends around the floor opening and overlies the surface of the floor, the improvement comprising, a seal member disposed between the flange and an upper surface of the floor and being adapted to prevent water infiltration therebetween and into the fitting, the seal member being formed of an intumescent material.

6. The wire filling of claim 5, wherein the seal member is formed of a compressible polymeric based intumescent material.

7. In a wiring fitting that is adapted to be supported in a floor opening in a floor of a building structure, the fitting including a seal member configured to seal against moisture infiltration into the wiring fitting, the improvement comprising forming the seal member from an intumescent fire retarding material.

8. The wiring fitting of claim 7, wherein the intumescent seal member has a hardness on the order of 40 SHORE A durometer.

9. The wiring fitting of claim 8, wherein the intumescent member is injection molded from a polymeric based intumescent material.

10. The wiring fitting of claim 7, wherein the intumescent seal member is molded from a polymeric based intumescent material.

11. The wiring fitting of claim 7, wherein the intumescent seal member is extruded from a polymeric based intumescent material.

12. The wiring fitting of claims 7, wherein the intumescent seal member is formed from a mixture of polyvinyl chloride and intumescent material.

13. In a wiring fitting that is adapted to be supported in a floor opening in a floor of a building structure, the fitting incorporating an intumescent member so that the fire rating of the floor, with the floor opening formed in the floor and the fitting supported in the floor opening, is substantially the same as the floor without the floor opening formed in the floor, the improvement comprising forming the intumescent member having a hardness on the order of 75 SHORE D durometer.

14. The wire fitting of claim 13, wherein the intumescent member comprises a cover assembly.

15. The wire fitting of claim 13, wherein the intumescent member comprises a cylindrical insert sized for insertion into the floor opening.

16. The wiring fitting of claim 13, wherein the intumescent member has a hardness of between 75–85 SHORE D durometer.

* * * * *